(12) United States Patent
Bourges et al.

(10) Patent No.: US 6,217,838 B1
(45) Date of Patent: Apr. 17, 2001

(54) PROCESS FOR REDUCING EMISSIONS OF OXIDES OF NITROGEN IN A MEDIUM WHICH IS SUPER-STOICHIOMETRIC IN OXIDIZING AGENTS

(75) Inventors: Patrick Bourges, Rueil-Malmaison; Mathias Bouchez, Meudon; Gil Mabilon, Carrieres sur Seine; Brigitte Martin, Saint Genis Laval, all of (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/415,236

(22) Filed: Oct. 12, 1999

(30) Foreign Application Priority Data

Oct. 12, 1998 (FR) .................................................. 98 12740

(51) Int. Cl.⁷ ............................... B01J 8/00; C01B 21/00
(52) U.S. Cl. ........................................ 423/239.1; 423/235
(58) Field of Search ................................. 423/235, 239.1

(56) References Cited

U.S. PATENT DOCUMENTS

| | | | |
|---|---|---|---|
| 5,266,083 | * 11/1993 | Peter-Hoblyn et al. | 44/358 |
| 5,433,933 | * 7/1995 | Eshita et al. | 423/213.2 |
| 5,788,936 | * 8/1998 | Subramanian et al. | 423/213.2 |
| 5,801,114 | * 9/1998 | Durand et al. | 502/302 |
| 5,804,148 | * 9/1998 | Kanesaka et al. | 422/174 |
| 5,830,421 | * 11/1998 | Gardner et al. | 423/213.2 |
| 5,968,861 | * 10/1999 | Feeley et al. | 502/74 |
| 5,974,793 | * 11/1999 | Kinugasa et al. | 60/285 |
| 6,010,673 | * 1/2000 | Kanazawa et al. | 423/213.5 |

FOREIGN PATENT DOCUMENTS

| | | |
|---|---|---|
| 0 577 438 | 1/1994 | (EP) . |
| 0 666 099 | 9/1995 | (EP) . |
| 0 709 129 | 5/1996 | (EP) . |
| 0 766 992 | 4/1997 | (EP) . |

\* cited by examiner

Primary Examiner—Steven P. Griffin
Assistant Examiner—Jonas N. Strickland
(74) Attorney, Agent, or Firm—Millen White Zelano & Branigan

(57) ABSTRACT

The invention concerns a process for reducing emissions of oxides of nitrogen in a medium which is super-stoichiomeitric in oxidising agents, comprising:

a) a step for oxidising at least a portion of the oxides of nitrogen in the presence of an oxidation material;

b) a step for injecting organic compounds which comprise at least one atom selected from carbon, hydrogen, oxygen and nitrogen;

c) a step for adsorbing at least a portion of the organic compounds onto an adsorption material in the form of molecular species and/or carbonaceous residues;

d) a step for selective reduction of at least a portion of the oxides of nitrogen to molecular nitrogen by at least a portion of the molecular species and/or carbonaceous residues formed on the adsorption material.

24 Claims, No Drawings

PROCESS FOR REDUCING EMISSIONS OF OXIDES OF NITROGEN IN A MEDIUM WHICH IS SUPER-STOICHIOMETRIC IN OXIDIZING AGENTS

TECHNICAL FIELD

The present invention relates to a process for eliminating oxides of nitrogen (NO and $N_2$, known as $NO_x$) in a medium which is super-stoichiormtric in oxidising agents.

This process relates to eliminating oxides of nitrogen present in exhaust gases from automotive or stationary lean-burn engines, whether lean burn spark ignition engines or compression ignition engines. This process can also be used to eliminate oxides of nitrogen from fumes from power station, from waste incinerators or from gas turbines. Such gases are characterized by oxides of nitrogen contents of several tens to several thousands of parts per million (ppm), by comparable amounts of reducing agents (CO, $H_2$, hydrocarbons) but above all by high concentrations of oxygen (from 1% to close to 20% by volume.)

The high toxicity of oxides of nitrogen and their role in the formation of acid rain and tropospheric zone have led to the instigation of strict regulations limiting the discharge of such compounds. In order to satisfy those regulations, it is generally necessary to eliminate at least a portion of such oxides present in exhaust gases from automotive or stationairy engines, from turbines or from power stations or incinerators.

In the case of engine exhaust gases, the elimination of oxides of nitrogen by thermal decomposition or preferably by cartalytic decomposition can be envisaged, but the high temperatures demanded by this reaction are incompatible with those of the exhaust gases. They can only be reduced using the reducing agents which are present, albeit in small quantities, in the exhaust gases (CO, $H_2$, unburned hydrocarbons or where combustion in the engine has been imperfect), and also using complemnentary reducing compounds which would have to be injected upstream of the catalyst. Such reducing agents are hydrocarbons, alcohols, ethers or other oxygen-containing compounds.

The reducing agent can be the vehicle fuel. Such fuels can be gasolines, which may or may not have added oxygen-containing compounds (for example alcohols, ethers), gas oils, liquefied gases (LPG), or compressed natural gases (CNG).

The reduction of nitrogen monoxide and dioxide (NO and $NO_2$) can, in accordance with the equations below, lead to the formation of either molecular nitrogen ($N_2$), or nitrous oxide ($N_2O$).

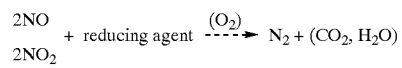

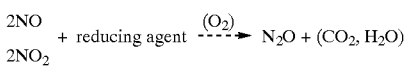

Molecular nitrogen ($N_2$) is the desired inoffensive product while the formation of nitrous oxide ($N_2O$), a non inert compound, should be avoided as far as possible.

The essential parameters for characterising the performances of the catalyst for eliminating oxides of nitrogen are:
 the temperature at which the reaction is maximal;
 the conversion or degree of elimination of $NO_x$;
 the selectivities for $N_2$ and $N_2O$;

and in particular the $N_2$ yield of the $NO_x$ reduction reaction which can be expressed by the relationship:

$$N_2 \text{ yield} = 100 \times \frac{NO_x \text{ disappeared} - 2 \times (N_2O \text{ formed})}{NO_x \text{ initial}}$$

PRIOR ART

The majority of work on developing catalysts which are ative in eliminating oxides of nitrogen in an oxidising medium has focussed on the use of transition metals (generally copper) exchanged on zeolites with Si/Al atomic ratios which are generally in the range 3 to 100 and in which the structures can be of different types (mordenite, faujasite, ZSM5, etc.) (United States patent U.S. Pat. No. 5,149,512). The thermal stability of copper catalysts exchanged on zeolitc can be improved by adding alkaline-earth and rare earth elements (lanthanum, P. Budi et al., Catalysis Letters, 41 (1996) 47–53, and cerine, Y. Zhang et al., Journal of Catalysis 194 (1996), 131–154). It should, however, he noted that these catalysts are highly selective for total reduction of oxides of nitrogen to molecular nitrogen (FR-A-2 655 565 and U.S. Pat. No. 5,149,511). These catalysts are active in converting oxides of nitrogen for temperatures in the range 350° C. to 550° C.

A large amount of work has been carried out on alumina type supports. Alumina has the advantage of being stable under diesel exhaust gas conditions. Alumina is active in reducing $NO_x$ to nitrogen by hydrocarbons at temperatures in the range 450° C. to 750° C. (Y. Kintaichi et al., Catalysis Let. 6 (1990) 239–244; N. Okazaki et al., Catalysis Let. 49 (1997) 169–174).

Catalysts based on transition metals exchanged on zeolite or of the alumina type are active in reducing $NO_x$ at temperatures of over 350° C. These conditions thus limit their use to depollute lcan burn gasoline engines and heavy diesel engines when these are functioning at full throttle and at high speeds. However, the exhaust gas temperature in light diesel engines is generally in the range 150° C. to 400° C. and rarely exceeds 500° C., which restricts the efficacy of such catalysts in eliminating oxides of nitrogen when the vehicle is used under normal conditions.

The use of precious metals as the active phase also enables a major portion of the oxides of nitrogen to be eliminated in proportions comparable to those measured with copper catalysts (EP-A-0 709 129). Such catalytic phases have the advantage of being active at much lower temperatures (200–300° C.), which is an essential advantage when depolluting exhaust gases from diesel vehicles where the engine exhaust temperatures are generally in the range 150° C. to 400° C.

Precious metals can be impregnated into different supports such as alumina, silica, zirconia, titanium oxide or zeolites. Platinum catalysts supported on zeolite (ZSM-5) can be prepared by ion exchange (EP-Al-0 709 129).

Platinum based catalysts am generally highly active at low temperatures for converting oxides of nitrogen NO and $NO_2$. However, the majority of such catalysts have the disadvantage of only partially reducing the $NO_x$, namely the major product formed is not molecular nitrogen ($N_2$) but nitrous oxide ($N_2O$). Further, supported platinum-based catalysts effect $NO_x$ reduction over a narrow temperature range. 180° C. to 350° C. (R. Burch et al., Catalysis Today 25 (1995) 185–206).

Certain catalytic metals such as indium or zinc can reduce $NO_2$ to nitrogen by hydrocarbons while on those metals, the reduction of NO to nitrogen by hydrocarbons is very low. M. Iwamoto et al., (Chemistry Letters (1997) 1283–1284; J. Chem. Soc., Chem. Commun. (1997) 37–38) propose tho reduction of $NO_x$ using two distinct catalysts. The first platinum based catalyst can oxidise NO to $NO_2$. The second Zn/MFI zeolite or In/MFI zeolite type catalyst, placed downstream of the oxidation catalyst, reduces $NO_2$ to $N_2$. The reducing agent is introduced into the gas stream between the two catalytic beds. That process reduces $NO_x$ between 200° C. and 500° C. in the presence of an excess of oxygen and in the absence of water. However, the conversion activity for $NO_x$ of that process is greatly diminished by the presence of water, with a gas stream which represents a diesel exhaust gas.

DESCRIPTION OF THE INVENTION

The present invention provides a process for reducing emissions of oxides of nitrogen in a medium which is super-stoichiometric in oxidising agents, comprising:

a) a step for oxidising at least a portion of the oxides of nitrogen in the presence of an oxidation material;

b) a step for injecting organic compounds the molecules of which comprise at least one atom selected from carbon, hydrogen, oxygen and nitrogen;

c) a step for adsorbing at least a portion of said organic compounds onto an adsorption material in the form of molecular species and/or carbonaceous residues;

d) a step for elective reduction of at least a portion of the oxides of nitrogen to molecular nitrogen by at least a portion of the molecular species and/or carbonaceous residues formed on the adsorption material.

The present invention provides a process for reducing $NO_x$ which can surprisingly obtain a comparable if not superior efficacy to that of prior art formulations, to eliminate oxides of nitrogen, from low temperatures and over a very broad temperature range (150–550° C.), in a highly oxidising gaseous mixture, which further has a substantially improved yield of molecular nitrogen due to good selectivity of the conversion of oxides of nitrogen to molecular nitrogen to the detriment of the undesirable formation of nitrous oxide ($N_2O$)

The process of the present invention enables $NO_x$ to be reduced with high conversion rates at temperatures which are equivalent to or lower than those required with conventional catalysts prepared by exchange of transition metals or noble metals, in particular copper or platinum, on zeolitcs, and with a nitrogen yield which is improved with respect to prepared catalysts based on precious metals on different supports.

The process of the invention can also reduce oxides of nitrogen using the vehicle fuel as the reducing agent.

The first step a) of the process of the invention can, in general, be carried out in the presence of a $NO_x$ oxidation material comprising:

at least one refractory inorganic oxide;

at least one element (A) from groups VIB, VIIB, VIIIB and IB, the transition metals and precious metals.

The refractory inorganic oxide generally comprises at least one compound selected from the group formed by the following compounds: zeolites, alumina, silica, silica-alumina, titanium oxide, zirconium oxide, a mixed oxide or a solid solution of at least two of the above oxides, or a mixture of at least two of these compounds. Of the refractory inorganic oxides cited above the Applicant prefers alumina.

Elements (A) from groups VIB, VIIB, VIIIB and IB, the transition metals and precious metals, are preferably copper, nickel, cohalt, iron, manganese, chromium, molybdenum, platinum, rhodium, ruthenium, iridium palladium or a mixture of at least two of these elements. However, the Applicant prefers platinum.

More particularly, the composition by weight of the oxidation material expressed as the percentage by weight with respect to the total weight of said active phase calcined at 550° C. for 4 h, is generally as follows:

90% to 99.9% of at least one refractory inorganic oxide;

0.1% to 10% of at least one element (A) from groups VIB, VIIB, VIIIB and IB, the transition metals and precious metals.

Generally, this first step is carried out in a first portion of the exhaust gas exhaust conduit.

The second step b) of the process of the invention can in general be defined by injection of reducing compounds. The reducing compounds are selected from hydrocarbons, alcohols, ethers or other organic oxygen-containing products, and the reducing compounds can also be selected from the fuels consumed by the engine or turbine.

Of the reducing compounds, the Applicant prefers heptanal and dicyclopentadiene.

The second step generally takes place in the exhaust line downstream of the $NO_x$ oxidation material usede in the first step.

Step c) of the process of the invention is generally carried out in the presence of a material enabling adsorption of organic compounds the molecules of which comprise at least one atom selected from carbon, hydrogen had oxygen, in the form of molecular species or carbonaceous residues comprising:

at least one refractory inorganic compound comprising at least one compound selected from: zeolites, alumina, silica, silica-alumina, titanium oxide, zirconium oxide, a mixed oxide or a solid solution of at least two of the above oxides, or a mixture of at least two of these compounds;

and optionally at least one element (B) from group IIA, the aLkafine-earths, or from group IIB, the rare earths.

In a first implementation of the invention, the material selected from materials permitting adsorption of organic compounds in the form of molecular species or carbonaceous residues comprises alumina.

In a second implementation of the invention, the material selected from materials permitting adsorption of said organic compounds in the form of molecular specics or carbonaceous residues comprise zeolites. The zeolites can be in the group formed by NU-86, NU-87, EU-1, Y and MFl.

More particularly, the composition by weight of the material permitting adsorption of organic compounds in the form of molecular species or carbonaceous residues, expressed as the percentage by weight with respect to the total weight of said active phase calcined at 550° C. for 4 h, is as follows:

90% to 100% of at least one refractory oxide;

0% to 10% of at least one element (B) from group IIA, the alkalin-earths, or from group IIIB, the rare earths.

Step c) is generally implemented on the exhaust line downstream of the organic compound injection apparatus.

Step d) for reducing oxides of nitrogen to molecular nitrogen by at least a portion of the molecular species and carbonaceous residues formed on the adsorption material enables at least a portion of the oxides of nitrogen oxygenated in step a) and at least a portion of the oxides or nitrogen not oxygenated in step a) to be reduced to molecular nitrogen.

The oxidation catalysts in step a) and the adsorption catalysts for the organic compounds of step c) described in the process of the invention are either in the form of beads, pellets or extrudates, or in the monolothic form (active phase deposited on a ceramic or metal support).

The following steps are carried out to prepare the oxidation catalyst used in step a):
- one or more steps to impregnate a support comprising at least one refractory oxide with at least one precursor of at least one element (A);
- optionally, a heat treatment step carried out in an oxidising, neutral or reducing medium after each impregnation step, at a temperature in the range 200° C. to 700° C.

Elements (A) are introduced by impregnating aqueous or organic solutions of precursors of metal or oxides of these elements, using techniques which are known to the skilled person, known as dry or excess impregnation.

Precursors of transition metals (A) are selected from nitrates, acetates and formates, in aqueous solutions, and acetylacetonates, which can be used in an organic medium. The precursors of precious metals (A) are those conventionally used to prepare catalysts, in particular and when they exist, chlorides, acid homologues of chlorides, chlorine-containing complexes, nitrates, amminated complexes, and acetyacetonates. Non limiting examples which can be cited are hexachloroplatiic acid, platinum tetrammine chloride, dintroso-diammino platinum, hexachloroiridic acid, ruthenium trichloride and ruthenium pentammine dichloride.

Steps for preparing the catalyst for adsorbing the organic compounds used in step c) of the process of the present invention are as follows:
- preparing a support comprising at least one refractory oxide;
- optionally, adding an element (B) from group IIA, the alkaline-earths or group IIIB, the rare carths, by impregnating with at least one precursor of at least one element from groups IIA and IIIB of the periodic table; and
- optionally, heat treating in an oxidising, neutral or reducing medium carried out after each impregnation step, at a temperature in the range 200° C. to 700° C.

When the catalyst comprises it, elements (B) are added to the refractory inorganic oxide by impregnating with aqueous or organic solutions of precursors of the metal or oxides of these elements, using techniques which are known to the skilled person, termed dry or excess impregnation.

Precursors of element (B) from group IIA, the alkaline-earths, can be introduced in the form of pigments, such as oxides, carbonates or sulphates. Preferably, however, precursors of these salts are impregnated onto the refractory oxide. In this case, the water-soluble salts used are preferably nitrates, acetates and formates. Precursors of element (B) belonging to group IIIB, the rare carths, which can be introduced in the form of pigments, are carbonates, oxalates or sulphates; however, preferably impregnation of an aqueous solution of at least one of their precursors, such as nitrates, is carried out.

The oxidation catalyts of step a) and the organic compound adsorption catalysts of step c) can be formed into beads, extrudates or pellets at any stage of the preparation. However, the Applicant prefers that the forming step is carried out directly on the refractory inorganic oxide before any modification, or after all the impregnation and calcining steps.

For use on a vehicle, it is often preferable to use rigid supports (monoliths) with a large open porosity (more than 70%) to limit pressure drops which could cause high gas flow rates, but above all high exhaust gas space velocities. These pressure drops prevent the engine from functioning properly and contribute to a reduction in the efficiency of an internal combustion engine (gasoline or diesel). Further, the exhaust line is subjected to vibrations and to substantial mechanical and thermal shocks, so catalysts in the form of beads, pellets or extrudates could deteriorate either by wear or by fracturing.

These monotliths can be:
- either ceramic, where the principal elements can be alumina, zirconia, cordierite, mullite, silica, aluminosilicates or a combination of several of these compounds;
- or a silicon carbide and/or nitride;
- or aluminium titanate;
- or of metal. They are obtained from iron, chromium or aluminium alloys optionally doped with nickel, cobalt, cerium or yttrium.

Metal supports can be produced by rolling corrugated strips or by stacking corrugated sheets to constitute a honeycomb structure with straight or zigzag channels which may or may not communicate with each other. They can also be produced from metal fibres or wires which are interlocked, woven or braided.

With supports of metal comprising aluminium in their composition, it is recommended that they are pre-treated at high temperature (for example between 700° C. and 110° C.) to develop a micro-layer of refractory alumina on the surface. This superficial micro-layer, with a porosity and specific surface area which is higher than that of the original metal, encourages adhesion of the active phase and protects the remainder of the support against corrosion.

In a process implementation, the process of the invention can be carried out with at least one catalyst comprising a monolithic support. The oxidation catalyst used in step a) can be based on a monolithic or non monolithic support independcatly of the catalyst used in step c) and the adsorption catalyst used in step c) can be based on a monolithic or non monolithic support which is independent of the catalyst used in step a).

The catalysts are prepared by coating these monolithic supports with a suspension comprising all or part of the element, constituting the catalytic phase. The elements not introduced in the preceding steps are impregnated onto the coated monolith in one or more steps in the form of a solution of their precursor salts.

The different steps of a method for preparing the oxidation catalyst of step a) and the organic compound adsorption catalyst of step c) on a monolithic support consist of coating the support with the refractory inorganic oxide then successively impregnating the precursors of the different elements constituting the catalytic phase. Each of these impregnation steps is followed by a specific heat treatment which is aimed at stabilising and conditioning the phase just constituted in a state where interaction with the following phase is the most appropriate.

The inorganic oxide is coated onto the monolithic support of ceramic or metal using a technique which is known to the skilled person. The coating technique consists of preparing an aqueous suspension of this oxide with a mineral or organic compound which can fix this oxide onto the support. In general this compound, known as a binder, is an alumina gel (boehmite) or a silica sol, which is added to the suspension comprising an organic or mineral acid (peptising agent). The oxide deposition operation is carried out by immersing the monolith in the suspension, by circulating the suspension through the monolith or by spraying this suspension onto the monolith. After eliminating excess suspension, the film of oxide is fixed on the support by drying then calcining the ensemble at a temperature which is generally in the range 300° C. to 900° C., preferably in the range 400° C. to 600° C.

The quantity of catalytic phase (or active phase) deposited on the monolithic support (or substrate) is generally in the range 20 to 300 g per litre of said support, advantageously in the range 50 to 200 g.

EXAMPLES

Examples 1 to 4 below illustrate the invention without in any way limiting its scope. Examples 5 to 10 describe the prior art $NO_x$ reduction process. Examples 11 and 12 describe the prior art $NO_x$ reduction process described by M. Iwamoto ct al. (Chemistry letters (1997) 1283–1284; J. Chem. Soc., Chem. Commun. (1997) 37–38).

For comparison purposes, all of these catalysts were tested (Example 13) in the laboratory in a micro-unit with a synthetic gas mixture.

In all of the examples, the designation of the active phase (or catalytic phase) deposited on the support (or substrate) corresponded to the sum of the elements constituting the catalyst described in the procedure below, namely: the refractory inorganic oxide, the transition metal oxides, the precious metals, and the oxides of the alkaline-earth and rare earth elements. The weight of monolithic substrate of ceramic or metal was not taken into account in the expression of the weight contents of each of the constituents of this catalytic phase.

As is usual in the art, the quantities of precious metals present in the catalyst are generally expressed in grams per litre of support.

Example 1 (in accordance with the invention)

The $NO_x$ reduction process used:

In step a), a Pt/alumina type oxidation catalyst. The weight of active phase deposited on the monolithic support was 120 g/l of monolithic support (the platinum content was 1.2 g/l of monolithic support).

In step b), an injection of organic compounds enabling heptanal to be injected; and In step c), an alurina type organic compound adsorption material (the weight of alumina deposited on the monolithic support was 120 g/l of monolithic support).

Example 2 (in accordance with the invention)

The $NO_x$ reduction process used:

In step a), a Pt/alumina type oxidation catalyst. The weight of active phase deposited on the monolithic support was 120 g/l of monolithic support (the platinum content was 1.2 g/l of monolithic support).

In step b), an injection of organic compounds enabling cyclopentadiene to be injected; and In step c), an alumina type organic compound adsorption material. The weight of alumina deposited on the monolithic support was 120 g/l of monolithic support.

Example 3 (in accordance with the invention)

The $NO_x$ reduction process used:

In step a), upstream of the gaseous stream, a Pt/alumina type oxidation catalyst (the weight of active phase deposited on the monolithic support was 120 g/l of monolithic support and the platinum content was 1.2 g/l of monolithic support).

In step b), an injection of organic compounds enabling heptanal to be injected; and In step c), an alumina NU87 zeolite type organic compound adsorption material (the weight of zeolite deposited on the monolithic support was 120 g/l of monolithic support).

Example 4 (in accordance with the invention)

The $NO_x$ reduction process used:

In step a), a Pt/alumina type oxidation catalyst. The weight of active phase deposited on the monolithic support was 120 g/l of monolithic support (the platinum content was 1.2 g/l of monolithic support).

In step b), an injection of organic compounds enabling cyclopentadiene to be injected; and In step c), a NU87 zeolite type organic compound adsorption material (the weight of zeolite deposited on the monolithic support was 120 g/l of monolithic support).

Example 5 (comparative)

The $NO_x$ reduction process used:

In step a), an injection of organic compounds enabling heptanal to be injected; and In step b), an alumina type organic compound adsorption material (the weight of alumina deposited on the monolithic support was 120 g/l of monolithic support).

Example 6 (comparative)

The $NO_x$ reduction process used:

In step a), an injection of organic compounds enabling cyclopentadiene to be injected; and In step b), an alumina type organic compound adsorption material (the weight of alumina deposited on the monolithic support was 120 g/l of monolithic support).

Example 7 (comparative)

The $NO_x$ reduction process used:

In step a), an injection of organic compounds enabling heptanal to be injected; and In step b), a NU87 zeolite type organic compound adsorption material (the weight of zeolite deposited on the monolithic support was 120 g/l of monolithic support).

Example 8 (comparative)

The $NO_x$ reduction process used:

In step a), an injection of organic compounds enabling cyclopentadiene to be injected; and In step b), a NU87 zeolite type organic compound adsorption material (the weight of zeolite deposited on the monolithic support was 120 g/l of monolithic support).

Example 9 (comparative)

The $NO_x$ reduction process used:

In step a), an injection of organic compounds enabling heptanal to be injected; and In step b), a Pt/alumina type catalyst. The weight of active phase deposited on the monolithic support was 120 g/l of monolithic support (the platinum content was 1.2 g/l of monolithic support).

Example 10 (comparative)

The $NO_x$ reduction process used:

In step a), an injection of organic compounds enabling cyclopentadiene to be injected; and In step b), a Pt/alumina type catalyst. The weight of active phase deposited on the monolithic support was 120 g/l of monolithic support (the platinum content was 1.2 g/l of monolithic support).

Example 11 (comparative)

The $NO_x$ reduction process used:

a) a Pt/alumina type oxidation catalyst. The weight of active phase deposited on the monolithic support was 120 g/l of monolithic support (the platinum content was 1.2 g/l of monolithic support).

b) an injection of organic compounds enabling heptanal to be injected; and c) an In/MFI zeolite type catalyst. The weight of active phase deposited on the monolithic support was 120 g/l of monolithic support (the indium content was 12 g/l of monolithic support).

Example 11 (comparative)

The $NO_x$ reduction process used:

a) a Pt/alumina type oxidation catalyst. The weight of active phase deposited on the monolithic support was 120 g/l of monolithic support (the platinum content was 1.2 g/l of monolithic support).

b) an injection of organic compounds enabling heptanal to be injected; and c) a Zn/MFI zeolite type catalyst. The weight of active phase deposited on the monolithic support was 120 g/I of monolithic support (the zinc content was 10 g/l of monolithic support).

Example 13

The catalysts prepared on ceramic supports were tested in the laboratory in a micro-unit with a mixture of synthetic gas comprising the principal families of compounds present in a diesel engine exhaust gas. The operating conditions were as follows:

| | |
|---|---|
| Space velocity (HSV) Composition of mixture | 50000 $h^{-1}$ |
| $No_x$ | 600 ppm |
| Organic compounds | 6000 ppm C (methane equivalent) |
| $O_2$ | 5% |
| $CO_2$ | 10% |
| CO | 500 ppm |
| $H_2O$ | 10% |
| $SO_2$ | 20 ppm |
| $N_2$ | Complement to 100% |
| Temperature | Increase from 150° C. to 500° C. (5° C./min) |

For examples 1, 3, 5, 7, 9, 11 and 12, the organic compound used was heptanal. For examples 2, 4, 6, 8 and 10, the organic compound used was dicyclopentadiene.

The principal components were continuously analysed at the reactor outlet using infrared detectors for the carbon monoxide (CO) and the nitrous oxide ($N_2O$), by flame ionisation for the organic compounds (HC) and by chemiluminescence for the oxides of nitrogen (NO and $NO_2$).

The results of these analyses enabled the evolution of the oxides of nitrogen conversion, of the selectivity for nitrous oxide and of the nitrogen yield to be determined as a function of the evolution of the reaction temperature.

The formulae for calculating the three parameters (expressed as a %) are as follows:

| | | |
|---|---|---|
| $NO_x$ conversion: | C | = 100 × ($NO_x$ inlet − $NO_x$ outlet)/$NO_x$ inlet |
| $N_2O$ selectivity: | S | = 100 × (2 × $N_2O$ formed)/$NO_x$ disappeared |
| $N_2$ yield: | R | = C × (100 − S)/100 |

Before carrying out the catalytic tests, the catalysts prepared on ceramic supports underwent heat treatment under the following conditions. The catalyst was placed in a stream constituted by 18% of oxygen, 10% of water and the complement of nitrogen for 8 h at 600° C. The catalysts which had undergone this heat treatment were tested in a micro-unit with a mixture of synthetic gas comprising the principal families of compounds present in an exhaust gas of a diesel engine, using the operating conditions described above.

Table I below shows the temperatures and the three parameters "$NO_x$ conversion", "$N_2O$ selectivity" and "$N_2$ yield" calculated for the test conditions corresponding to the lowest $NO_x$ emissions at the catalyst outlet (highest conversions). Further, the temperature range over which $NO_x$ conversion was more than 20% is noted in the column "temperature range where $NO_x$ conversion >20%".

TABLE 1

Catalytic tests in micro-unit

| Process of Example | Max $NO_x$ conversion (%) | $N_2O$ selectivity (%) | $N_2$ yield (%) | Max temperature conversion (° C.) | Temperature range where $NO_x$ conversion > 20% |
|---|---|---|---|---|---|
| 1 (inv) | 50 | 10 | 45 | 290 | 200 to 550° C. |
| 2 (inv) | 40 | 5 | 38 | 310 | 190 to 550° C. |
| 3 (inv) | 45 | 15 | 38 | 260 | 210 to 540° C. |
| 4 (inv) | 35 | 5 | 33 | 300 | 215 to 530° C. |
| 5 (comp) | 37 | 1 | 36 | 600 | 520 to 680° C. |
| 6 (comp) | 36 | 1 | 35 | 605 | 525 to 680° C. |
| 7 (comp) | 31 | 1 | 30 | 480 | 430 to 505° C. |
| 8 (comp) | 30 | 1 | 29 | 485 | 435 to 510° C. |
| 9 (comp) | 35 | 60 | 14 | 240 | 230 to 255° C. |
| 10 (comp) | 30 | 50 | 15 | 260 | 250 to 275° C. |
| 11 (comp) | 35 | 5 | 33 | 440 | 360 to 510° C. |
| 12 (comp) | 33 | 5 | 31 | 430 | 350 to 500° C. |

It can be seen that the process of the invention reduces $NO_x$ from low temperatures over a very wide temperature range, in contrast to prior art processes. Further, even if $NO_x$ conversion is carried out at low temperature, the selectivity for reduction to $N_2O$ remains low.

As a result, the process of the invention performs better for the reduction of all the oxygen-containing compounds of nitrogen to molecular nitrogen: the nitrogen yields are higher in the temperature range 200° C. to 550° C.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/12.740, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for reducing emissions of oxides of nitrogen in a medium which is super-stoichiometric in oxidising agents, comprising:
   a) a step for oxidising at least a portion of the oxides of nitrogen in the presence of an oxidation material;
   b) a step for injecting organic compounds the molecules of which comprise at least one atom selected from carbon, hydrogen, oxygen and nitrogen;
   c) a step for adsorbing at least a portion of said organic compounds onto an adsorption material in the form of molecular species and/or carbonaceous residues;
   d) a step for selective reduction of at least a portion of the oxides of nitrogen to molecular nitrogen by at least a portion of the molecular species and/or carbonaceous residues formed on the adsorption material.

2. A process according to claim 1, in which the material for oxidising the oxides of nitrogen in step a) comprises:
   at least one refractory inorganic oxide;
   at least one element (A) from groups VIB, VIIB, VIIIB and IB, the transition metals and precious metals.

3. A process according to claim 2, in which the refractory inorganic oxide of the oxidation material of step a) comprises at least one compound selected from zeolites, alumina, silica, silica-alumina, titanium oxide, zirconium oxide and a mixed oxide.

4. A process according to claim 2, in which the refractory inorganic oxide of the oxidation material of step a) comprises alumina.

5. A process according to claim 4, in which element (A) of the oxidation material of step a) is platinum.

6. A process according to claim 2, in which element (A) of the oxidation material of step a) is platinum.

7. A process according to claim 6, in which the material for adsorbing organic compounds used in step c) comprises at least one element (C) from group IIA, the alkaline-earths, or from group IIIB, the rare earths.

8. A process according to claim 7, in which the organic compounds injected in step b) comprise heptanal or dicyclopentadiene.

9. A process according to claim 1, in which the material enabling adsorption of organic compounds of step c) comprises at least one refractory inorganic oxide.

10. A process according to claim 1, in which the material for adsorbing organic compounds used in step c) comprises at least one element (C) from group IIA, the akaline-earth, or from group IIIB, the rare earth.

11. A process according to claim 1, in which the refractory inorganic oxide of the adsorption material of step c) comprises at least one zeolite.

12. A process according to claim 1, in which the refractory inorganic oxide of the adsorption material of step c) comprises at least one alumina.

13. A process according to claim 1, in which the organic compounds injected in step b) comprise at least one compound selected from hydrocarbons, alcohols, ether, oxygen-containing organic products and fuels.

14. A process according to claim 1, in which the organic compounds injected in step b) comprise heptanal.

15. A process according to claim 1, in which the organic compounds injected in step b) comprise dicyclopentadiene.

16. A process according to claim 1, in which the oxidation material of step a) is in the form of beads, extrudates or pellets.

17. A process according to claim 1, in which the adsorption material used in step c) is in the form of beads, extrudates or pellets.

18. A process according to claim 1, in which the oxidation material used in step a) is supported on a monolithic substrate.

19. A process according to claim 1, in which the adsorption material used in step c) is supported on a monolithic substrate.

20. A process according to claim 1, for reducing oxides of nitrogen emissions wherein said medium is an emission from stationary engines, diesel engine vehicles, lean burn gasoline engine vehicles and by turbines functioning with natural gas (CNG) or liquefied gas (LPG) or with a liquid fuel.

21. A process according to claim 1, wherein step b) is downstream from step a).

22. A process according to claim 21, wherein the oxidation material comprises at least one element (A) from groups VIB, VIIB, VIIIB, and IB.

23. A process according to claim 1, wherein step c) is downstream from step a).

24. A process according to claim 1, wherein step c) is downstream from step b), which in turn is downstream from step a).

* * * * *